United States Patent Office 2,921,882
Patented Jan. 19, 1960

2,921,882

GERMICIDAL COMPOSITIONS CONTAINING AROMATIC ACETYLENIC DIOLS

Morton W. Leeds, Union, and Robert J. Tedeschi, Whitehouse Station, N.J., assignors to Air Reduction Company, Incorporated, New York, N.Y., a corporation of New York No Drawing. Application August 15, 1956
Serial No. 604,076

3 Claims. (Cl. 167—30)

This invention relates to new and useful symmetrical di-(chlorophenyl) substituted acetylenic glycols, their mode of preparation, and their use as germicides.

The novel acetylenic glycols of this invention may be represented by the formula

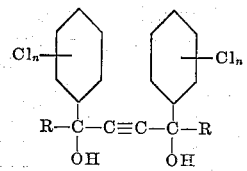

wherein R is hydrogen or an akyl radical containing from 1 to 4 carbon atoms, as methyl, ethyl, propyl, or butyl, and n as an integer of from 1 to 3 inclusive. The following compounds are representative of those included within the scope of this generic formula:

(I) 1,4-di-(p-chlorophenyl)-2-butyne-1,4-diol
(II) 2,5-di-(p-chlorophenyl)-3-hexyne-2,5-diol
(III) 2,5-di-(2,4-dichlorphenyl)-3-hexyne-2,5-diol
(IV) 2,5-di-(2,4-5-trichlorphenyl)-3-hexyne-2,5-diol
(V) 2,5-di-(3,4-6-trichlorophenyl)-3-hexyne-2,5-diol
(VI) 3,6-di-(p-chlorophenyl)-4-octyne-3,6-diol
(VII) 4,7-di-(p-chlorophenyl)-5-decyne-4,7-diol
(VIII) 5,8-di-(p-chlorophenyl)-6-dodecyne-5,8-diol The novel symmetrical di-(chlorophenyl) acetylenic glycols may be prepared by reacting acetylene with a suitable carbonyl compound in the presence of finely divided potassium hydroxide and in a reaction medium comprising a polar organic solvent under substantially anhydrous conditions, followed by hydrolysis of the reaction mixture. Suitable carbonyl compounds include p-chlorobenzaldehyde to prepare Compound I, above; p-chloroacetophenone to prepare Compound II, above; 2,4-dichloroacetophenone to prepare Compound III, above; 2,4,5-trichloroacetophenone, 3,4,6-trichloroacetophenone to prepare Compounds IV and V, respectively, above; and p-chloropropiophenone, p-chlorobutyrophenone, and p-chloropentophenone to prepare Compounds VI, VII, and VIII, respectively, above. It will be recognized that other symmetrical di-(chlorophenyl) acetylenic glycols included within the generic formula given above can be prepared from the corresponding chlorophenyl carbonyl compound containing not more than three chlorine atoms.

The reaction may be carried out at temperatures of from about 20°–50° C., although temperatures of from 35°–40° C. are preferred. Reaction temperatures much below 20° C. result in slow reaction rates and lead to the formation of the corresponding monohydric acetylenic carbinol rather than the desired acetylenic glycol, whereas temperatures much above 50° C. result in undesirable reactions such as the decomposition of the acetylenic glycol and aldol condensation. While atmospheric pressure may be used and is preferred, pressures up to about 15 atmospheres may be used. The potassium hydroxide employed in the reaction should be substanially pure, i.e., at least 90% pure, substantially anhydrous, i.e., contain not more than about 10% water, and should be finely divided.

It is essential that the reaction medium in which the reaction is conducted be a polar organic solvent. The oxygenated organic solvents, such as the mono-, poly-, or cyclic ethers, have been found to be especially useful. Suitable polar organic solvents include isopropyl ether, methylal, dimethyl Cellosolve, dibutyl Cellosolve, and dioxane.

The following example will serve to illustrate the preparation of the novel compounds of this invention.

EXAMPLE 1

*Preparation of 2,5-di(p-chlorophenyl)-3-hexyne-2,5-diol*

Into a suitable dry reactor were added 300 cc. dry dioxane. The solvent was stirred and the reactor purged with nitrogen for 10 minutes, followed by the rapid addition of 46.7 g. finely ground 90% KOH (0.75 mole pure KOH). The resulting slurry was vigorously stirred and saturated with dry acetylene gas at 25–35° C. To the saturated slurry at 35° C., over a period of from 15–30 minutes, was added 77.0 g. (0.50 mole) p-chloroacetophenone in the presence of excess acetylene gas. During the ketone addition, and for several hours afterward, there was a vigorous absorption of acetylene gas, and a somewhat exothermic reaction which occasionally necessitated the use of a cooling bath. The reaction slurry became slightly thicker during this time, but is readily stirrable. The reaction temperature is maintained at 35–40° C. The reaction was continued for an additional two hours in the presence of a slight excess of acetylene after absorption of acetylene had almost ceased. Total reaction time was 5-6 hours.

Isolation of the reaction products was accomplished by cooling the reaction slurry to 15° C. and adding 75 cc. of water to hydrolyze the resulting acetylenic glycol —KOH complex and acetylenic monohydric carbinol —KOH complex.

The lower aqueous caustic layer was separated from the upper organic or dioxane layer, and the aqueous layer was extracted once with 50–75 cc. of dioxane. The combined dioxane layers were neutralized by the addition of small pieces of Dry Ice. The dioxane layer was filtered and flash distilled to remove dioxane at atmospheric pressure. At a pot temperature 75° to 110° C., the pressure during the distillation was gradually lowered and the following fractions were collected at 8 mm. by distillation through 12" Vigreaux column.

Fraction I: 30–80° C. (5. g.)
Fraction II: 100–115° C. (20 g.)

Fraction II consisted of two components boiling at 100–105° C. and 115–117° C. The lower boiling minor component was unreacted p-chloroacetophenone and the higher boiling component was p-chloro-3-phenyl-1-butyn-3-ol. By fractional distillation at 8 mm. the valuable by-product p-chloro-3-phenyl-1-butyn-3-ol can readily be obtained pure.

The molten pot residue, 70 g. was treated with 100–150 cc. n-heptane (or any similar hydrocarbon solvent), stirred, cooled to room temperature, and allowed to crystallize. The resulting cream-colored solid which was 2,5-di-(p-chlorophenyl)-3-hexyne-2,5-diol, after filtration and drying, weighed 55 g. and was 93% pure by ethynyl group analysis. This material was recrystallized from xylene, washed with low boiling petroleum ether and dried to obtain a relatively pure product.

*Analysis.*—Calculated for $C_{18}H_{16}O_2Cl_2$: C, 64.6; H, 4.77, Cl, 21.2. Found: C, 63.5; H, 5.05; Cl, 21.5.

It has also been found that the novel symmetrical di-(chlorophenyl) acetylenic glycols of this invention possess remarkable and unexpected bactericidal and bacterostatic activity and may be used effectively to control various micro-organisms. Further, the germicides of this invention are stable in alkaline media at normal or moderate temperatures, and do not readily decompose under heat and light.

These novel germicides may be employed in any suitable form, dissolved or dispersed with a major proportion of a carrier medium to obtain germicidal preparations and compositions capable of controlling the growth of a wide variety of micro-organisms. For example, the effective toxicant may be dissolved or otherwise dispersed, in alcohol or other suitable solvent, water, or mixture of water and solvent to produce a tincture or solution; or the acetylenic glycol may be dispersed in oils, e.g., cottonseed oil or other vegetable oil, fats and greases to be applied as a protective film or lotion; or the acetylenic glycol toxicant may be incorporated in finely-divided solids such as talc, clay, corn starch, zinc oxide, and the like.

Generally, the acetylenic glycol would represent from 0.001 percent to 1 percent by weight of the germicidal composition, although it will be recognized that the amount of the toxicant used will depend upon a variety of factors including the particular micro-organism to be controlled, and the specific di-(chlorophenyl) acetylenic glycol employed. Additional materials, such as perfumes, coloring matter and the like may be incorporated in the germicidal preparation, as long as the adjuvant is inert with respect to reacting with or inhibiting the activity of the germicidally active acetylenic glycol.

The germicidal compositions containing an acetylenic glycol of this invention as the essential active ingredient may be used for coating or impregnating various materials such as textiles, paper, and articles formed from these materials such as, for example, bandages, surgical dressings, clothing, etc. The germicidal preparation may be applied to the material by any conventional means as by spraying, dipping or padding. They may also be used to disinfect various articles, such as dishes, utensils, tools, instruments, furniture and the like. The acetylenic glycols of this invention may be incorporated in plastic materials and extruded in the form of filaments, films, bristles, and other articles. The novel acetylenic glycols of this invention may also be employed as germicides in cosmetics or toilet preparations such as hand creams, face creams, shaving creams, salves, hair tonics, soaps, lotions, or may be used together with dispersing agents or detergents to render such detergent compositions germicidal. It is also advantageous to incorporate the germicides in coating compositions such as paints or lacquers.

The following example will illustrate the germicidal properties of the symmetrical di-(chlorophenyl) acetylenic glycols of this invention.

EXAMPLE 2

The germicidal test procedure used was that known as the F.D.A. agar cup plate method, described in circular 198 of the U.S. Department of Agriculture, published in December 1931. Briefly, the test is as follows:

20 cc. of nutrient agar was melted, allowed to cool to 45° C. and poured into sterile Petri dishes. To the cooled agar, 0.1 cc. of a twenty-four hour culture of each of the bacteria in Table 1 below, namely, *M. pyogenes* var. *aureus* and *E. coli* was added. The agar was allowed to harden and a disc was cut out, using a cork borer 1.5 cm. in diameter. A stock solution was made up at a concentration of 100 milligrams of the material to be tested as indicated in Table 1 below to 10 cc. with ethyl alcohol and then diluted to 100 cc. with distilled water, resulting in a fine suspension of 1 milligram per cc. A second solution was made up in the same manner, but at a concentration of 0.5 milligram per cc. Into each cup 0.2 cc. of each solution was placed. All of the prepared plates were then incubated under unglazed porcelain tops for twenty-four hours at 35° C. Each plate was performed in duplicate. At the end of the incubation period, all of the plates were examined for a clear zone that might be present around the cup, which would be indicative of the test material having inhibitory properties. The width of the zone of inhibition was measured in millimeters and indicates the diffusibility of the inhibitory agent. Table 1, which follows, records the results obtained.

A zone of inhibition of from 1–3 mm. indicates fair bacteriostatic value; a zone of from 3 mm. to 6 mm. indicates good bacteriostatic value; a zone of from 6 mm. to 9 mm. indicates very good bacteriostatic value; and a zone of above 9 mm. indicates excellent bacteriostatic value.

Table 1
NUTRIENT AGAR

| Test Material Dilution (mg./cc.) | Zone of Inhibition (mm.) | |
| --- | --- | --- |
| | M. pyogenes var. aureus | E. Coli |
| 2,5-di(chlorophenyl)-3-hexyne-2,5-diol: | | |
| 1.0 | 2 | 10 |
| 0.5 | 4 | 4 |
| G–11: | | |
| 2,2'-dihydroxy-3,4,6,3',4',6'-hexachlorodiphenyl-methane, 1.0 | | 9 |

The data in Table 1, above clearly demonstrates the bacteriostatic properties of 2,5-di-(p-chlorophenyl)-3-hexyne-2,5-diol and compares it with the well-known germicide G–11. It is seen that the symmetrical di-(chlorophenyl) acetylenic glycols of this invention compare favorably with G–11. Further, the symmetrical acetylenic glycols are heat and light stable, whereas one of the disadvantages of G–11 is its poor stability under these conditions.

It will be understood that the other symmetrical di-(chlorophenyl) acetylenic glycols described above would possess similar bactericidal and bacteriostatic properties and that the examples given above are merely illustrative. Other concentrations of the active ingredient may also be employed without departing from either the spirit or scope of this invention.

We claim:
1. 2,5-di-(p-chlorophenyl)-3-hexyne-2,5-diol.
2. The method of preparing 2,5-di-(p-chlorophenyl)-3-hexyne-2,5-diol which comprises reacting acetylene with p-chloroacetophenone in the presence of finely divided potassium hydroxide and in the presence of a polar organic solvent at a temperature from about 20°–50° C., and hydrolyzing the reaction products.
3. A germicidal composition comprising as the essential active ingredient a minor amount of 2,5-di-(p-chlorophenyl)-3-hexyne-2,5-diol and a major amount of an inert carrier.

References Cited in the file of this patent
UNITED STATES PATENTS 2,250,445    Brunson et al.          July 29, 1941
2,435,524    Weizmann             Feb. 3, 1948

OTHER REFERENCES

Johnson: "The Chemistry of the Acetylenic Compounds," vol. 1, "The Acetylenic Alcohols," page 313, pub. by Edward Arnold & Co., London (1946).